(12) United States Patent
Specht

(10) Patent No.: US 10,247,331 B1
(45) Date of Patent: Apr. 2, 2019

(54) MULTI-FUNCTIONAL ELECTRICAL SERVICE AND DEVICE SUPPORTING ASSEMBLY

(71) Applicant: Cirtcele Electric Inc., Wilmington, DE (US)

(72) Inventor: David M. Specht, Mesa, AZ (US)

(73) Assignee: CIRTCELE ELECTRIC INC., Wilmington, DE (US)

( * ) Notice: Subject to any disclaimer, the term of this patent is extended or adjusted under 35 U.S.C. 154(b) by 0 days.

(21) Appl. No.: 15/497,131

(22) Filed: Apr. 25, 2017

Related U.S. Application Data

(60) Provisional application No. 62/327,401, filed on Apr. 25, 2016.

(51) Int. Cl.
| | | |
|---|---|---|
| *H02B 1/26* | (2006.01) | |
| *F16L 5/00* | (2006.01) | |
| *H02G 3/06* | (2006.01) | |
| *H02G 3/22* | (2006.01) | |
| *G02B 6/44* | (2006.01) | |
| *E01F 9/685* | (2016.01) | |
| *E04H 12/22* | (2006.01) | |

(52) U.S. Cl.
CPC .............. *F16L 5/00* (2013.01); *G02B 6/4451* (2013.01); *H02G 3/06* (2013.01); *H02G 3/22* (2013.01); *E01F 9/685* (2016.02); *E04H 12/2284* (2013.01); *H02B 1/26* (2013.01)

(58) Field of Classification Search
None
See application file for complete search history.

(56) References Cited

U.S. PATENT DOCUMENTS

| | | |
|---|---|---|
| 3,341,268 A | 9/1967 | Bickford |
| 3,450,951 A | 6/1969 | Boyle |
| 3,502,785 A | 3/1970 | Nickola |
| 3,753,047 A | 8/1973 | Shallbetter |
| 4,372,513 A | 2/1983 | Calnan |
| 4,519,657 A | 5/1985 | Jensen |
| 4,751,610 A | 6/1988 | Nickola |
| 4,864,467 A * | 9/1989 | Byrd ........................ H02B 1/50 174/38 |
| 4,887,187 A | 12/1989 | Nickola |

(Continued)

*Primary Examiner* — Courtney L Smith
(74) *Attorney, Agent, or Firm* — Venjuris PC

(57) ABSTRACT

An apparatus for supporting an underground main service entrance device and at least one secondary service entrance device and a kit for assembling such apparatus are disclosed. A preferred embodiment of such an apparatus comprises metal posts, metal bars, a first enclosure, at least one second enclosure, and at least one enclosure-connecting conduit. The bars of the embodiment are preferably coupled to the posts horizontally. The preferred first enclosure is configured to contain a main service entrance device. The preferred second enclosure is configured to contain a secondary service entrance device. The first enclosure is preferably attached to two of the bars near the top while the second enclosure is preferably attached to at least one of the bars below the first enclosure. The first and second enclosures are connected by the enclosure-connecting conduit. The components of the embodiment are preferably removably coupled and may be reconfigured when needed.

16 Claims, 4 Drawing Sheets

(56) References Cited

U.S. PATENT DOCUMENTS

| | | | | |
|---|---|---|---|---|
| 5,400,212 | A * | 3/1995 | Hanson | H02B 1/03 |
| | | | | 174/38 |
| 5,404,266 | A | 4/1995 | Orchard et al. | |
| 5,638,256 | A | 6/1997 | Leach et al. | |
| 5,838,078 | A * | 11/1998 | Tipton | H02B 1/50 |
| | | | | 307/147 |
| 6,188,145 | B1 * | 2/2001 | Stewart | G01R 11/02 |
| | | | | 307/125 |
| 7,085,128 | B2 * | 8/2006 | Wilfong | H02B 1/50 |
| | | | | 174/38 |
| 7,314,205 | B2 | 1/2008 | Pickens et al. | |
| 2005/0201044 | A1 * | 9/2005 | Baca | H02B 1/50 |
| | | | | 361/664 |
| 2005/0257488 | A1 | 11/2005 | Higgins | |
| 2010/0200711 | A1 * | 8/2010 | Schoenfeld | H02B 1/03 |
| | | | | 248/176.1 |
| 2011/0175453 | A1 * | 7/2011 | Batzler | H02J 9/06 |
| | | | | 307/68 |
| 2013/0106397 | A1 * | 5/2013 | Fulton | G01R 11/04 |
| | | | | 324/76.11 |

* cited by examiner

MULTI-FUNCTIONAL ELECTRICAL SERVICE AND DEVICE SUPPORTING ASSEMBLY

CROSS-REFERENCE TO RELATED APPLICATION

The present application claims priority to a United States provisional patent application entitled "Multi-Functional Electrical Service and Device Supporting Assembly" having Ser. No. 62/327,401, filed on Apr. 25, 2016, which is entirely incorporated herein by reference.

BACKGROUND

Post mounted systems for supporting electrical services and wiring devices can be used for permanent or temporary buildings. They are commonly used in mobile home and recreational vehicle parks where no permanent structures exist to support electric meters. Post mounted systems may be pre-assembled in shop and thus significantly shorten the time of installing and wiring on the field. Existing systems are generally designed for a specific use, lacking space for extra circuit breakers or mounting abilities for additional wiring devices, and thus cannot be reconfigured to accommodate additional boxes.

Additional branch circuit breaker boxes may be needed for containing additional service entrance devices such as service conductors for a detached garage, outlets with different voltage and currents for different types of RV homes or equipment, or Transient Voltage Surge Suppressors (TVSS) to eliminate or reduce damages to critical equipment by limiting transient (surge) voltage and currents. Additionally, for a mobile home park, the electric needs of customers vary. A 50 Amp and a 30 Amp RV outlets are popular in most mobile home and recreational vehicle parks, but many RV homes are starting to adopt new 100 Amp systems, such as Siemens™ 100A meter load center MC1224B1100ESC. Therefore, re-configurability and scalability of the mounting systems are important for mobile home parks to serve diverse client equipment.

It is desirous to have a reconfigurable system for mounting underground service entrance devices.

It is also desirous to have a pre-assembled system for mounting underground service entrance devices in order to save time for installation and in case of emergencies.

Finally, since the layout of a service entrance sections (SES) must be approved for compliance with current safety codes before the activation of power services, it is further desirous to have a pre-assembled mounting system that complies with the required safety codes so that it can be ready for immediately replacing an obsolete or damaged SES.

SUMMARY

The structure, overall operation and technical characteristics of the present invention will become apparent with the detailed description of preferred embodiments and the illustration of the related drawings as follows.

The invention is incorporated in a system for mounting or supporting an underground main service entrance device and at least one secondary service entrance device and a kit for assembling such system. A preferred embodiment of the system comprises multiple metal posts, a plurality of metal bars, a first enclosure, at least one second enclosure, and at least one enclosure-connecting conduit.

In this embodiment, the posts are parallel to each other and to be installed partially underground to support the embodiment. The posts are preferably capped on the top. The bars of this embodiment are metal channel struts such as Unistrut® metal framing products and coupled to the posts horizontally.

The first enclosure of this embodiment is attached to one or preferably a plurality of the bars near the top of the embodiment. The exemplary first enclosure is configured to contain a main service entrance device such as a meter base, a combination service entrance device (CSED, i.e. an all-in-one meter/panel), and so forth.

The at least one second enclosure in this embodiment can be coupled to one or more of the bars and connected to the first enclosure by the enclosure-connecting conduit. This exemplary second enclosure is configured to contain a secondary service entrance device. Examples of a secondary service entrance device include a telephone entrance panel, a cable TV service entrance device, a solar power panel equipment, a sub-panel or an additional service conductor for providing electricity from the common meter base in the first enclosure to a detached structure, and so forth.

The components of this embodiment are preferably coupled to each other removably so that the configuration may be changed or additional components may be added as needed. Any fasteners or techniques known in the art that attach while allowing adjustments in the heights of the bars, the distance between the posts, and locations of the first/second enclosures may be used.

Another preferred embodiment may additionally include at least one underground conduit that allows wires to go out of or come into the at least one second enclosure to/from the ground or other locations. An alternate embodiment may also include a lighting apparatus on the top to be used when a user is installing or maintaining the embodiment. An embodiment may additionally include PVC pipe tapes, or other suitable insulation materials, coupled to the outer surfaces of any metal elements of the embodiment installed under, or near, the ground in order to provide electrical insulation and prevent abrasion by rocks and debris and corrosion by UV and moisture. In such an embodiment, the PVC pipe tapes, or any suitable insulation materials, can be used to wrap the outer surfaces of the metal posts, the riser(s), and/or the underground conduit(s) all the way from the lower end(s) of the metal element(s) to a certain height above the ground, such as at least 4".

An embodiment may further include a riser configured to be installed partially underground and accommodate underground power transmission lines. An exemplary riser would be connected to the first enclosure and preferably affixed to at least one bar. Different utility companies may have different rules about whether and how the riser should be fastened to the bar which may affect the number of bars or the minimum or maximum distance between the bars in different embodiments. For instance, Arizona Public Service company, APS, in Arizona requires that the riser be securely fastened by at least one strap at ⅓ the distance up from the ground (i.e. the finished grade) between the riser entrance at the bottom of the first enclosure and the ground. Therefore, when an embodiment is used with the APS system or any compatible systems, the riser of the embodiment would be affixed to at least one bar with the required height from the ground.

An embodiment may further include one or more ground wires attached to the first and/or second enclosure(s) and configured to electrically couple the panels/circuits in the enclosure(s) to a ground rod during installation.

A preferred embodiment of the kit for assembling a system for supporting multiple underground service entrance devices may include a plurality of metal posts, a plurality of metal bars, a first enclosure, at least one second enclosure, and at least one enclosure-connecting conduit to be assembled and installed as stated above. The embodiment of the kit may additionally comprise the optional components as illustrated above, including a riser, an underground conduit, insulation tapes, ground wires, and so forth.

These exemplary post mounted pedestals, having been preapproved by the electric company, can be used in cases of emergency. For instance, where an old power panel or pedestal has failed, an embodiment may be installed in less than 24 hours without inspection and used with a generator to restore power. The embodiment can then be connected to the underground power at a later time without reinstallation and in conformity with the applicable laws, codes, and regulations. Additionally, an embodiment like this can be installed directly against a permanent structure (i.e. zero clearance). The embodiment can thus be transformed into a permanent service entrance assembly, if desired, by removing the metal posts supporting the assembly and affixing the metal bars to the structure without moving the assembly or reinstalling a new service entrance system.

One object of this invention is to provide a system for supporting an underground main service entrance device and at least one secondary service entrance device.

Another object of this invention is to provide such a system that is reconfigurable and scalable.

BRIEF DESCRIPTION OF THE DRAWINGS OR PICTURES

DESCRIPTION OF THE EMBODIMENTS

Figure 1:
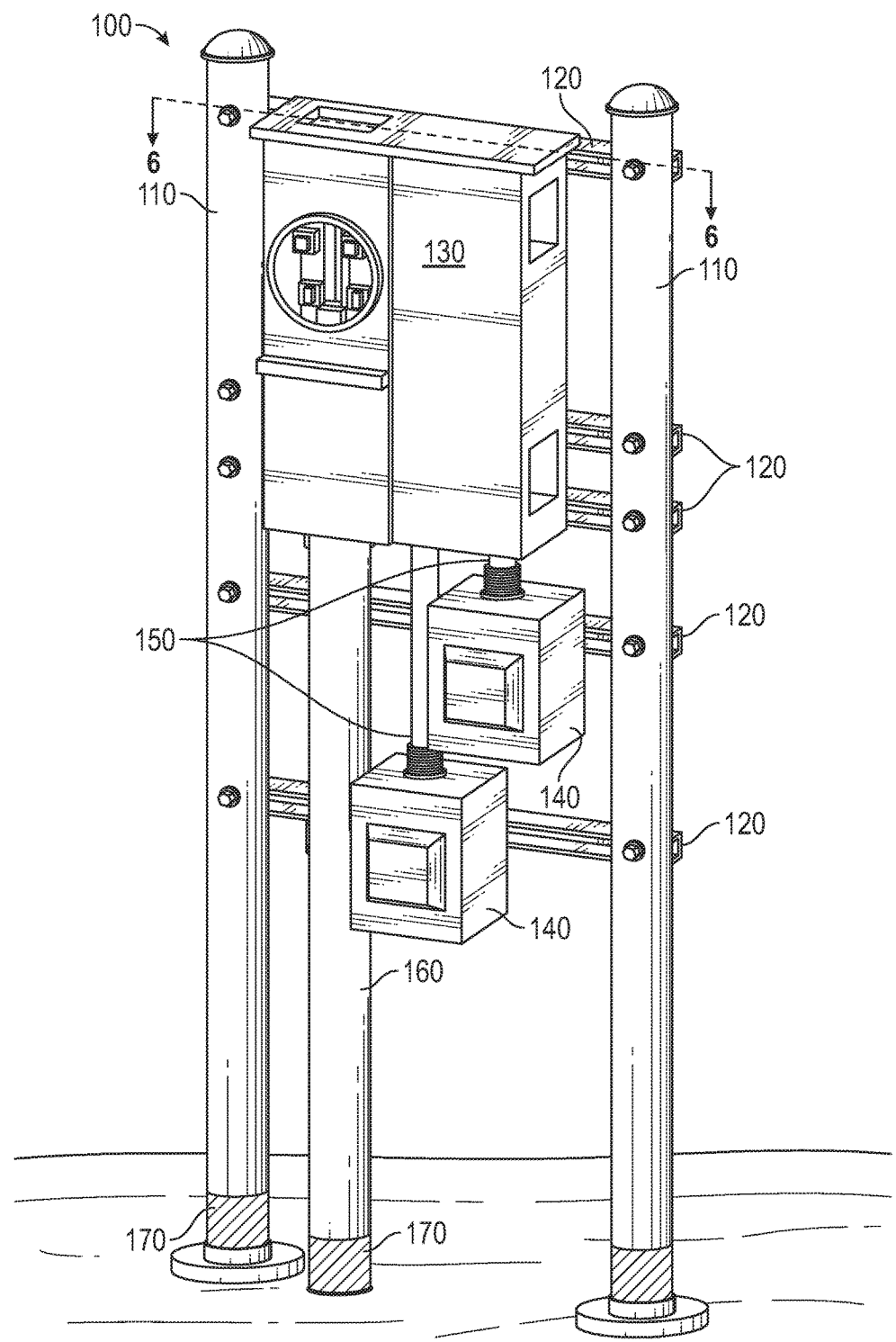
FIG. 1 shows an embodiment of the system for supporting a main service entrance device and two secondary service entrance devices.

The preferred embodiments are shown in FIGS. 1-6. The preferred embodiment (100) shown in FIG. 1 has capped metal posts (110), horizontal metal channel bars (120), a first enclosure (130), second enclosures (140), enclosure-connecting conduits (150), a metal riser (160), and PVC adhesive tapes (170). The posts (110) and the riser (160) have been installed by being partially buried underground. The required depths of the underground portions are determined by the utility company and local safety codes. This embodiment (100) is used with a CSED (131 in FIG. 6) located in the first enclosure (130). The riser (160) allows underground transmission lines (not shown) to pass through and be coupled to the meter (not shown) of the CSED (131) installed by the utility company. The PVC adhesive tapes (170) in this embodiment wrap around, preferably 1" or half-lapped, the posts (110) and the riser (160) from their lower ends up to at least 4", or any height as required by local rules, above the final grade in order to protect the posts (110) and the riser (160) from rust, abrasion, and corrosion.

The second enclosures (140) of the embodiment (100) in FIG. 1 are configured to contain secondary service entrance devices (shown as 141 & 142 in FIG. 6) and are coupled to the first enclosure (130) by the enclosure-connecting conduits (150) where the electric power and/or control lines pass through. In this embodiment (100), the bars (120) are removably coupled to the posts (110) by bolts, nuts, and washers. The first enclosure (130) of this embodiment (100) is fastened to the first and second highest bars (120) while the second enclosures (140) are respectively coupled to the third and fourth bars (120) in a zigzag fashion in order to save space.

This embodiment (100) in FIG. 1 is scalable and reconfigurable. If an additional second enclosure is needed, an extra bar may be added and placed below the currently lowest bar to support the additional second enclosure. Alternatively, if the wiring needs change, the locations of the second enclosures (140) may be switched easily.

Figure 2:
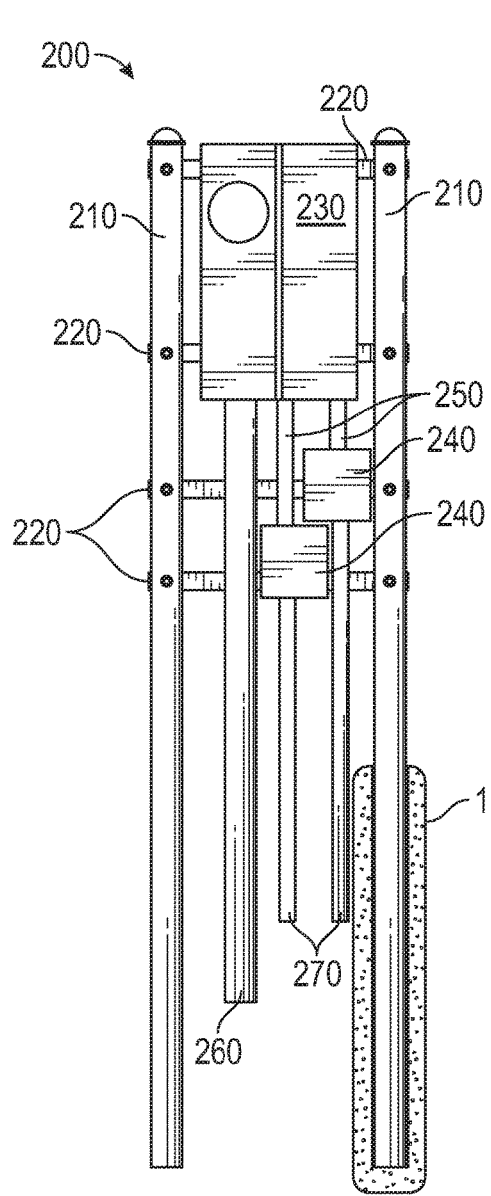
FIG. 2 shows an alternate embodiment that further includes underground conduits.

FIG. 2 shows another preferred embodiment (200) that comprises capped metal posts (210), horizontal bars (220, i.e. the Unitstrut™ pieces), a first enclosure (230), second enclosures (240), enclosure-connecting conduits (250), an underground riser (260), and two underground conduits (270). In addition to the components similar to those in the embodiment (100) illustrated above, the underground conduits (270) of this embodiment (200) are installed partially underground for wires to go out from the RV receptacles (i.e. the secondary service entrance devices) in the second enclosures (240). This embodiment (200) is installed upright with concrete (1) surrounding the lower portions of the posts (210).

An exemplary use of the embodiment (200) in FIG. 2 is an electric power pedestal which include an all-in-one meter/panel inside the first enclosure (230) of the embodiment (200), a set of circuits in a second enclosure (240) for air conditioner, and an another set of circuits placed in another second enclosure (240) for additional electrical load in an Arizona room.

Figure 3:
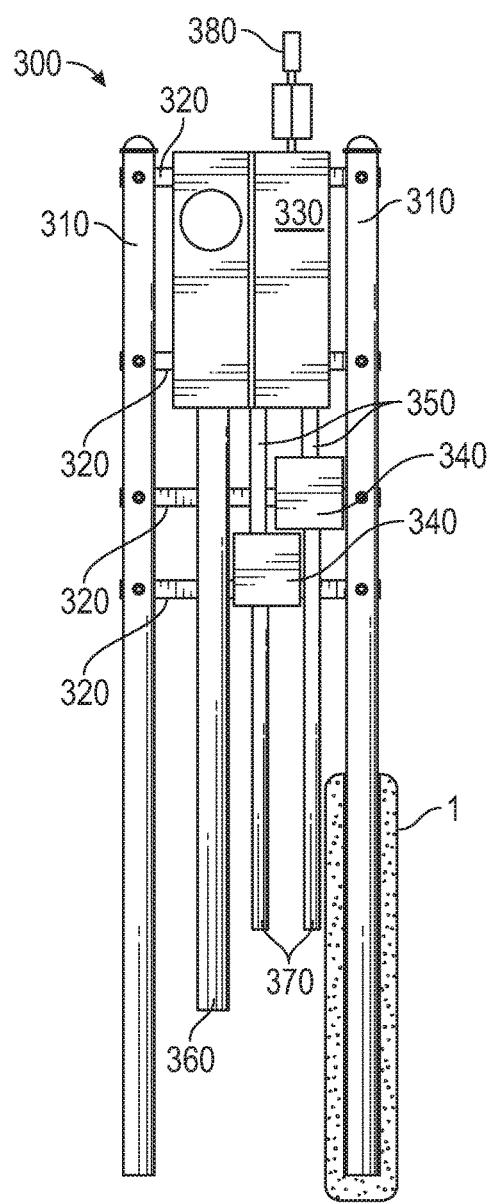
FIG. 3 shows another embodiment that additionally includes a light.

FIG. 3 shows a preferred embodiment (300) similar to the embodiment (200) in FIG. 2. This embodiment (300) further comprises a lighting device (380) that can illuminate the embodiment (300) when a user is maintaining the embodiment (300) or to indicate the location of the power center in a RV park at night.

Figure 4:
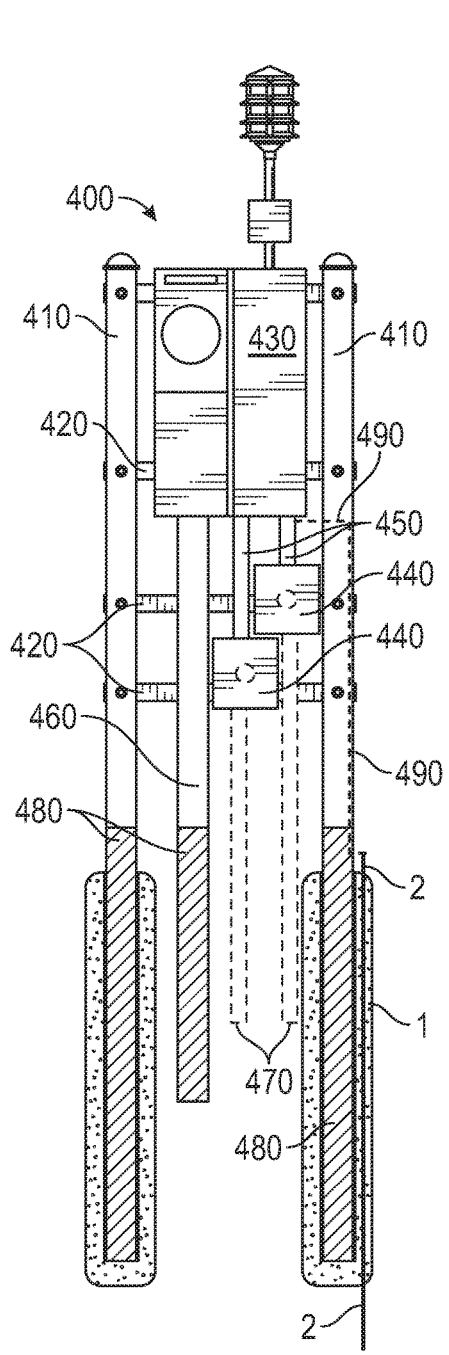
FIG. 4 shows an alternate embodiment with a light.

FIG. 4 shows an alternate preferred embodiment (400) which comprises two capped metal posts (410), four horizontal metal bars (420), a first enclosure (430), two second enclosures (440), two enclosure-connecting conduits (450), a metal underground riser (460), two underground conduits (470), corrosion protection tapes (480), and at least one ground wire (490). The corrosion protection tapes (480) are used to wrap the metal elements of the embodiment (400), the posts (410) and the riser (460) here, from the lower ends up to a certain height above the ground. Like the embodiments shown in FIGS. 2-3, this embodiment (400) may be installed with concrete (1) surrounding the metal posts (410) underground. If the concrete exceed the final grade level, which is common, it is preferable that the wrapped portions of the metal elements go even higher. As shown in FIG. 4, the top of the concrete is approximately 1" above the ground while the wrapped portions of the metal posts (410) and the riser (420) extend at least 4" above the ground.

Furthermore, the ground wire (490) of this embodiment (400) is attached to the first enclosure (410) and electrically coupled to a ground rod (2), by an acorn clamp or any suitable grounding connectors (not shown). During installation, the ground wire (490) may be further connected to a ground bar in a panel placed inside the first enclosure (410). This preferred embodiment (400) is 24" wide and 8' tall, with the first enclosure mounted 5', or no lower than 4' but no higher than 6'3", above the ground.

Up to this date, to the best knowledge of the inventor, this preferred embodiment (400) meets and/or exceeds local and national electric codes and is the only electrical assembly of this type approved by a local utility company and two municipalities in Arizona. An embodiment like this embodiment (400) can be installed directly against a permanent structure. As such, this embodiment (400) can be used in a construction site to provide electricity and other services, while a house is being built, and later be affixed to the house by removing the metal posts (410), if desired.

Figure 5:
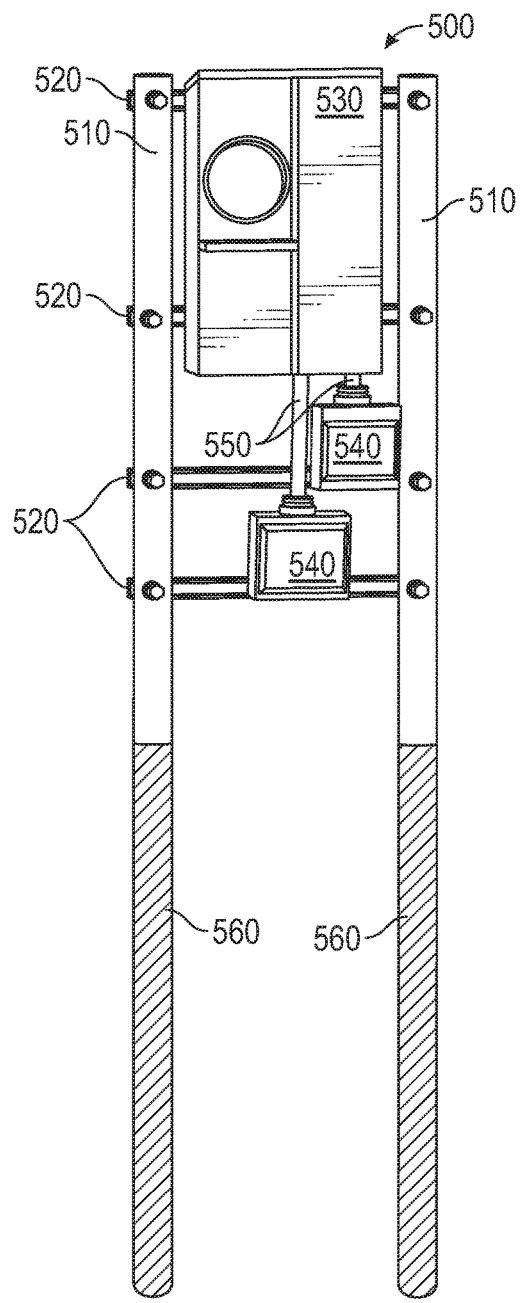
FIG. 5 shows an embodiment for supporting a main service entrance device and two secondary service entrance devices but having no riser or underground conduits.
Figure 6:
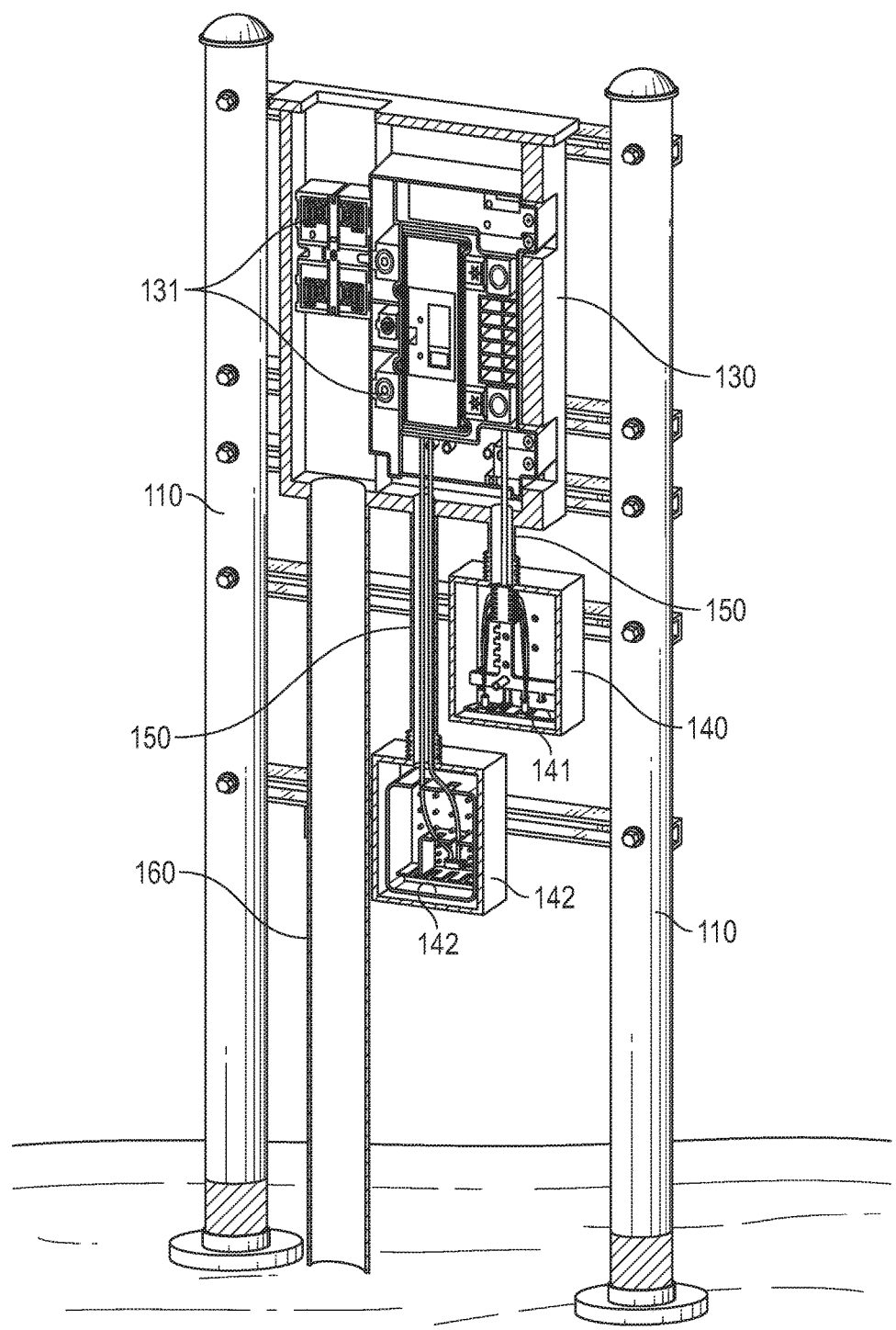
FIG. 6 shows a front view of the embodiment in FIG. 1, with the components cut alone a virtual line A-A in FIG. 1.

FIG. 5 shows an alternate embodiment (500) that includes two metal posts (510), four horizontal metal bars (520), a first enclosure (530), two second enclosures (540), two enclosure-connecting conduits (550), and corrosion protection tapes (560) wrapped around the lower portions of the posts (510). This embodiment (500) does not include a riser and may replace a power pedestal that fails but has a working riser or be installed with a generator to temporarily restore power in case of emergency.

While the invention has been described by means of specific embodiments, numerous modifications and variations could be made thereto by those with ordinary skills in the art without departing from the scope and spirit disclosed herein. For instance, a person skilled in the art may adopt components with different dimensions in order to accommodate assorted service entrance devices, change the number of secondary service entrance devices to meet the customers' needs, use components of various materials to save cost, and/or arrange enclosures differently in order to meet the local codes or save space.

What is claimed is:

1. An assembly for supporting a main service entrance device and at least one secondary service entrance device above a surface of a ground, the assembly comprising:
   (a) two or more metal posts parallel to each other and configured to be installed partially underground in an upright position;
   (b) a plurality of metal bars, each removably coupled to at least two of the posts and located above the surface of the ground after the metal posts are installed;
   (c) a first enclosure removably coupled to at least one of the metal bars and configured to contain the service entrance devices;
   (d) at least one second enclosure removably coupled to the at least one or at least another one of the metal bars and configured to contain the at least one secondary service entrance device; and;
   (e) at least one enclosure-connecting conduit removably coupled to the first enclosure and the at least one second enclosure and configured to allow a wiring between the main service entrance device and the at least one secondary service entrance device to pass through; and;
   (f) a main electric conduit affixed to one of the metal bars and coupled to the first enclosure and configured to be partially installed underground and accommodate an underground transmission line extending from the first enclosure to underground.

2. The assembly in claim 1 further comprises at least one second electric conduit coupled to the at least one second enclosure and configured to be partially installed underground and accommodate a cable extending from the secondary service entrance device to underground.

3. The assembly in claim 1, wherein each metal post is hollow and further comprises a cap on a top end of the post.

4. The assembly in claim 1, wherein the metal bars are removably coupled to at least two of the posts horizontally.

5. The assembly in claim 1 further comprises a light located at a top of the assembly.

6. The assembly in claim 1, wherein the first enclosure, the at least one second enclosure, the main electric conduit, and at least one enclosure-connecting conduit are metal.

7. The assembly in claim 1 further comprises an insulation protective tape covering an outer surface of a lower portion of at least one of the posts and configured to protect the outer surface from abrasion and corrosion.

8. The assembly in claim 1 further comprises a ground wire coupled to one of the first enclosure and the at least one second enclosure and configured to electrically couple one of the main service entrance device and the at least one secondary service entrance devices to a ground rod after installation.

9. A kit for assembling an assembly for supporting a main service entrance device and at least one secondary service entrance device above a surface of a ground, the kit comprising:
   (a) two or more metal posts configured to be installed parallel to each other and partially underground in an upright position;
   (b) a plurality of metal bars, each configured to be removably coupled to at least two of the posts and located above the surface of the ground after the metal posts are installed;
   (c) a first enclosure configured to be removably coupled to at least one of the metal bars and contain the main service entrance device;
   (d) at least one second enclosure configured to be removably coupled to at least one of the metal bars and contain the at least one secondary service entrance devices; and;
   (e) at least one enclosure-connecting conduit configured to be removably coupled to the first enclosure and the at least one second enclosure and allow a wiring between the main service entrance device and the at least one secondary service entrance device to pass through; and;
   (f) a main electric conduit affixed to one of the metal bars and configured to be coupled to the first enclosure and partially installed underground and accommodate a underground transmission line extending from the first enclosure to underground.

10. The kit in claim 9 further comprises at least one second electric conduit configured to be coupled to the at least one second enclosure and partially installed underground and accommodate a cable extending from the secondary service entrance device to underground.

11. The kit in claim 9, wherein each metal post is hollow and further comprises a cap on a top end of the metal post.

12. The kit in claim 9 further comprises a light configured to be coupled to a top of the assembly.

13. The kit in claim 9, wherein the first enclosure, the at least one second enclosure, the main electric conduit, and at least one enclosure-connecting conduit are metal.

14. The kit in claim 9 further comprises an insulation protective tape configured to cover an outer surface of a lower portion of at least one of the posts and protect the outer surface from abrasion and corrosion.

15. The kit in claim 9 further comprises a ground wire configured to be coupled to one of the first enclosure and the at least one second enclosure and electrically couple one of the main service entrance device and the at least one secondary service entrance devices to a ground rod.

16. A method for assembling an assembly for supporting a main service entrance device and at least one secondary service entrance device and installing the assembly on site, the method comprising the steps of:

(a) Positioning two or more metal posts parallel to each other;

(b) Removably coupling a plurality of metal bars to at least two of the posts above the surface of the ground;

(c) Removably coupling a first enclosure containing the main service entrance device to at least one of the metal bars;

(d) Removably coupling at least one second enclosure containing the at least one secondary service entrance device to at least one of the metal bars;

(e) Removably coupling at least one enclosure-connecting conduit to the first enclosure and the at least one second enclosure, the at least one enclosure-connecting conduit configured to allow a wiring between the main service entrance device and the at least one secondary service entrance device to pass through;

(f) Installing the assembly on site with the two or more metal posts partially underground in an upright position;

(g) Electrically coupling the main service entrance device to a power source; and;

(h) Coupling a main electric conduit, configured to be partially installed underground and accommodate a underground transmission line extending from the first enclosure to underground, to one of the metal bars and the first enclosure.

* * * * *